United States Patent
Spink et al.

(10) Patent No.: US 10,766,606 B2
(45) Date of Patent: Sep. 8, 2020

(54) SEMI CANTILEVERED LANDING GEAR ACTUATED BY AN EXTERNAL ARTICULATING LOAD DAMPER FOR IMPROVED TAKE-OFF

(71) Applicant: Goodrich Corporation, Charlotte, NC (US)

(72) Inventors: Charles J. Spink, Seattle, WA (US); Ian Kopp, Seattle, WA (US); Dennis W. Martin, Woodinville, WA (US); William E. Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 378 days.

(21) Appl. No.: 15/786,371

(22) Filed: Oct. 17, 2017

(65) Prior Publication Data
US 2019/0112033 A1    Apr. 18, 2019

(51) Int. Cl.
*B64C 25/00* (2006.01)
*B64C 25/62* (2006.01)

(52) U.S. Cl.
CPC ............ *B64C 25/001* (2013.01); *B64C 25/62* (2013.01); *B64C 2025/008* (2013.01)

(58) Field of Classification Search
CPC .............................. B64C 25/001; B64C 25/62
See application file for complete search history.

(56) References Cited

U.S. PATENT DOCUMENTS

| | | | |
|---|---|---|---|
| 2,810,535 A | 10/1957 | Albright | |
| 3,345,019 A | 10/1967 | Black et al. | |
| 4,359,199 A * | 11/1982 | Kramer | B64C 25/34 244/100 R |
| 5,110,068 A * | 5/1992 | Grande | B64C 25/34 244/100 R |
| 5,743,491 A * | 4/1998 | Meneghetti | B64C 25/34 244/102 A |
| 6,173,920 B1 * | 1/2001 | Meneghetti | B64C 25/34 244/100 R |
| 6,279,854 B1 | 8/2001 | Lindahl | |
| 6,308,916 B1 | 10/2001 | Hrusch | |
| 9,994,309 B2 * | 6/2018 | Hodgkinson | B64C 25/34 |
| 2012/0211600 A1 * | 8/2012 | Mellor | B64C 25/00 244/100 R |
| 2013/0119196 A1 * | 5/2013 | Lindahl | B64C 25/22 244/100 R |

FOREIGN PATENT DOCUMENTS

| | | |
|---|---|---|
| EP | 1041001 | 10/2000 |
| WO | 2006133902 | 12/2006 |

OTHER PUBLICATIONS

European Patent Office, European Search Report dated Sep. 24, 2019 in Application No. 18179663.2.

* cited by examiner

*Primary Examiner* — Justin M Benedik
(74) *Attorney, Agent, or Firm* — Snell & Wilmer L.L.P.

(57) ABSTRACT

A landing gear arrangement may comprise a lever configured to be coupled between an axle and a strut piston of a shock strut, a load damper configured to be externally coupled between the shock strut and the lever, wherein the load damper is configured to increase a length of the landing gear arrangement in response to an extension force of the load damper increasing above a ground force reacted through the landing gear arrangement. The load damper may be located externally from the strut piston.

17 Claims, 6 Drawing Sheets

SEMI CANTILEVERED LANDING GEAR ACTUATED BY AN EXTERNAL ARTICULATING LOAD DAMPER FOR IMPROVED TAKE-OFF

CROSS REFERENCE TO RELATED APPLICATIONS

This application claims priority to, and the benefit of, U.S. Provisional Patent Application Ser. No. 62/524,073, entitled "SEMI CANTILEVERED LANDING GEAR ACTUATED BY AN EXTERNAL OIL/NITROGEN SHOCK CARTRIDGE FOR IMPROVED TAKE-OFF," filed on Jun. 23, 2017. The '073 Application is hereby incorporated by reference in its entirety for all purposes.

FIELD

The present disclosure relates to aircraft landing gear, and more particularly, to systems and methods for extending landing gear.

BACKGROUND

Pitch rotation of an airplane is limited by the length of the shock strut. The shock strut may be lengthened to achieve a greater angle of attack for the airplane during initial rotation of the aircraft during take-off.

SUMMARY

A landing gear arrangement is disclosed, comprising a lever configured to be coupled between an axle and a strut piston of a shock strut, a load damper configured to be externally coupled between the shock strut and the lever, wherein the load damper is configured to increase a length of the landing gear arrangement in response to an extension force of the load damper increasing above a ground force reacted through the landing gear arrangement.

In various embodiments, the lever is configured to rotate with respect to the strut piston.

In various embodiments, the landing gear arrangement further comprises a first link configured to be rotatably coupled to a second link, wherein the first link is configured to be coupled to the load damper and the second link is configured to be coupled to the lever.

In various embodiments, the first link comprises a first attachment point whereby the first link is configured to be rotatably coupled to a strut cylinder of the shock strut, a second attachment point whereby the first link is configured to be rotatably coupled to the load damper, and a third attachment point whereby the first link is configured to be rotatably coupled to the second link.

In various embodiments, the load damper comprises a load damper cylinder, and a load damper piston operatively coupled to the load damper cylinder.

In various embodiments, the load damper passively transmits the extension force to the lever.

A landing gear arrangement for an airplane is disclosed, comprising a shock strut comprising a strut cylinder and a strut piston, wherein the strut piston has a first end disposed within the strut cylinder and a second end extending from the strut cylinder, a lever coupled to the second end of the strut piston, and a load damper coupled between the shock strut and the lever, wherein the load damper is located externally from the strut piston, wherein the load damper is configured to increase a length of the landing gear arrangement in response to an extension force of the load damper increasing above a ground force reacted through the landing gear arrangement.

In various embodiments, the lever rotates with respect to the strut piston.

In various embodiments, the load damper comprises a load damper cylinder, and a load damper piston operatively coupled to the load damper cylinder.

In various embodiments, the load damper passively transmits the extension force to the lever.

In various embodiments, the load damper is mechanically coupled to the strut piston.

In various embodiments, the load damper is mechanically coupled to the strut cylinder.

In various embodiments, the landing gear arrangement further comprises a first link, and a second link rotatably coupled to the first link, wherein the first link is coupled to the load damper and the second link is coupled to the lever.

In various embodiments, the first link comprises a first attachment point whereby the first link is rotatably coupled to the strut cylinder, a second attachment point whereby the first link is rotatably coupled to the load damper, and a third attachment point whereby the first link is rotatably coupled to the second link.

In various embodiments, the landing gear arrangement further comprises an axle mounted to the lever.

In various embodiments, the lever rotates away from the second end in response to the load damper extending.

In various embodiments, the lever engages the second end in response to the load damper compressing.

A method for extending a landing gear for an airplane is disclosed, comprising generating a lift force, decreasing a ground force in response to the lift force, extending a load damper in response to the ground force being decreased, and extending the landing gear in response to the load damper being extended, wherein the load damper is located externally from the landing gear.

In various embodiments, the method further comprises rotating a lever in response to the load damper being extended.

In various embodiments, the load damper extends in response to the ground force decreasing below an extension force of the load damper.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Pitch rotation of an airplane may be limited by the length of the shock strut. The shock strut may be lengthened to achieve a greater angle of attack for the airplane during initial rotation of the aircraft during take-off. An external articulating load damper, as disclosed herein, may passively cause a lever to rotate with respect to a strut piston to extend a landing gear during take-off. The load damper may comprise a pressure vessel defined by a cylinder and a piston configured to retract and extend with respect to the cylinder. The piston may extend from the cylinder in response to an extension force of the load damper being greater than a ground force on the landing gear, causing the total length of the landing gear to increase and allowing greater airplane pitch rotation during take-off and thereby preventing tailstrike. The load damper may further dampen ground forces during take-off and/or landing. The external articulating load damper, as disclosed herein, may comprise a passive system, thereby minimizing part count, reducing total weight of a landing gear arrangement, and/or increasing robustness of the landing gear.

Figure 1:
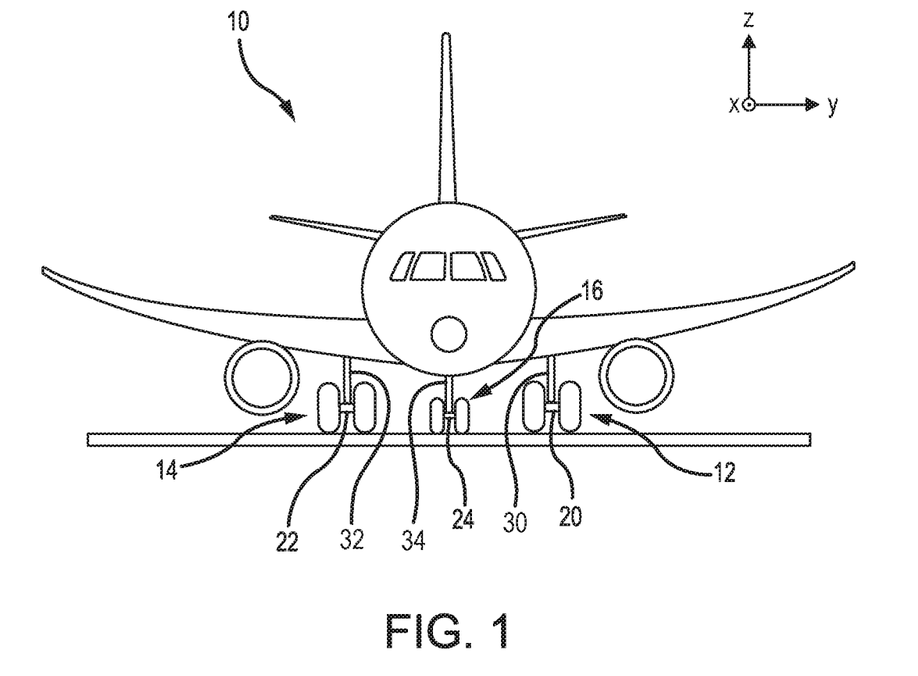
FIG. 1 illustrates an aircraft, in accordance with various embodiments.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include shock strut 30 and wheel assembly 20. Landing gear 14 may include shock strut 32 and wheel assembly 22. Landing gear 16 may include shock strut 34 and nose wheel assembly 24.

Figure 2:
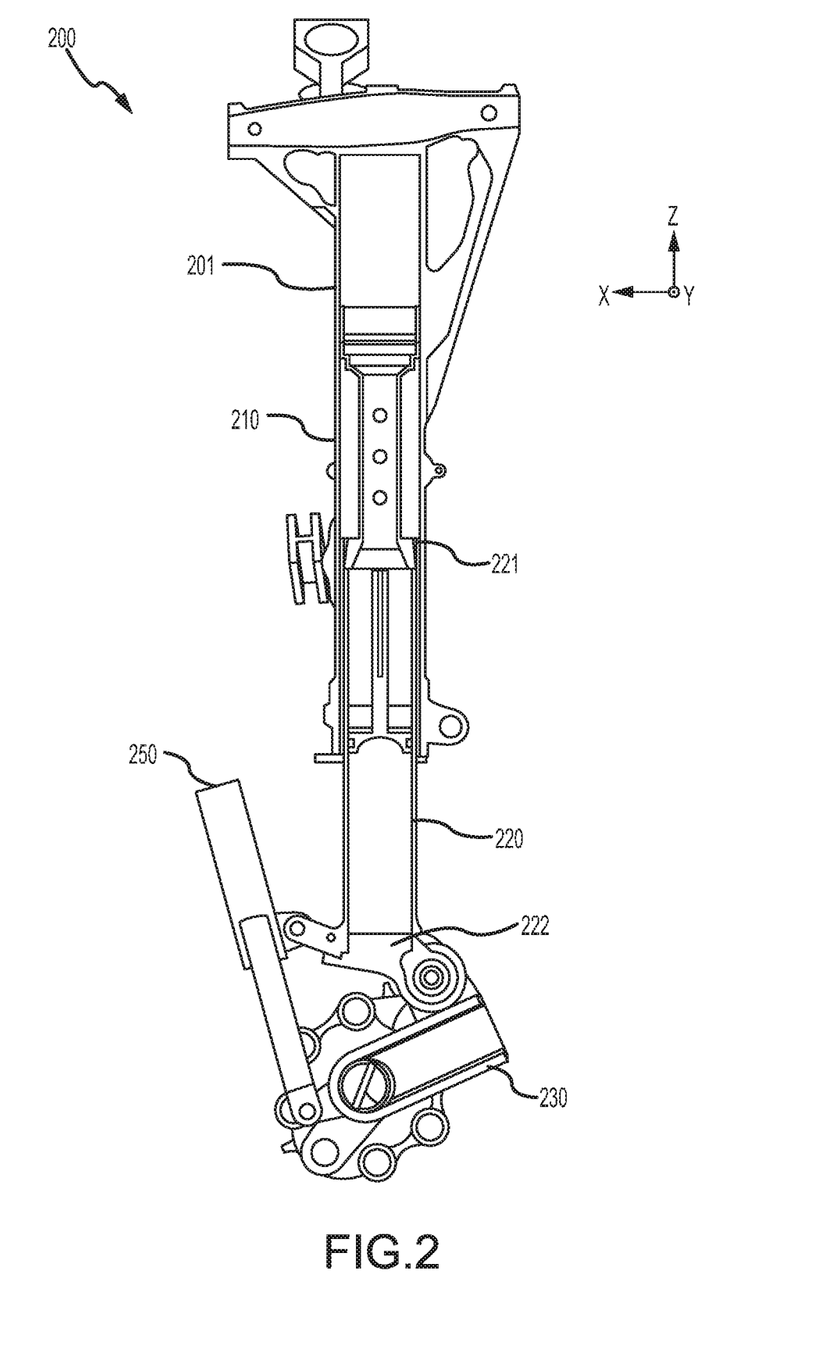
FIG. 2 illustrates a schematic view of a landing gear arrangement, in accordance with various embodiments.

With reference to FIG. 2, a landing gear arrangement 200 is illustrated, in accordance with various embodiments. Landing gear 12 and landing gear 14 of FIG. 1 may be similar to landing gear arrangement 200. Landing gear arrangement 200 may comprise a shock strut 201. Shock strut 201 may comprise a strut cylinder 210 and a strut piston 220. Strut piston 220 may be operatively coupled to strut cylinder 210. Strut piston 220 may comprise a first end 221 disposed within strut cylinder 210 and a second end 222 extending from strut cylinder 210. Strut cylinder 210 may be configured to receive strut piston 220 in a manner that allows the two components to telescope together and absorb and dampen forces transmitted thereto. In various embodiments, a liquid, such as a hydraulic fluid and/or oil may be located within strut cylinder 210. Further, a gas, such as nitrogen or air, may be located within strut cylinder 210. Strut cylinder 210 and strut piston 220 may, for example, be configured to seal such that fluid contained within strut cylinder 210 is prevented from leaking as strut piston 220 translates relative to strut cylinder 210. In various embodiments, load damper 250 may comprise a single-stage shock absorber. It is contemplated herein that components such as a metering pin, check valve, or other components associated with dampers may be used within load damper 250. Load damper 250 may comprise a pneumatic shock absorber.

In various embodiments, landing gear arrangement 200 may comprise a lever 230 and an external articulating load damper (load damper) 250. Lever 230 may be rotatably coupled to strut piston 220. In this regard, lever 230 may be configured to rotate with respect to strut piston 220. Strut piston 220 may comprise a first lug 224, with momentary reference to FIG. 3A, whereby lever 230 is rotatably coupled to strut piston 220. Load damper 250 may be located externally from strut piston 220. In this regard, load damper 250 may be externally coupled between shock strut 201 and lever 230. In various embodiments, load damper 250 may be coupled between strut piston 220 and lever 230. Strut piston 220 may comprise a second lug 226, with momentary reference to FIG. 3A, whereby load damper 250 is rotatably coupled to strut piston 220.

Figure 3A:
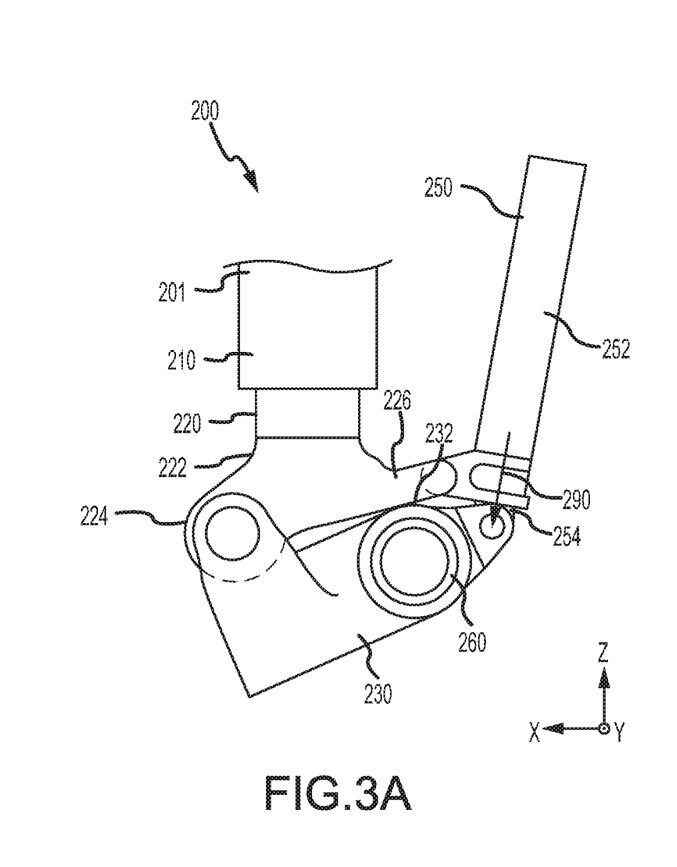
FIG. 3A illustrates a schematic view of a landing gear arrangement in a static position, in accordance with various embodiments.
Figure 3B:
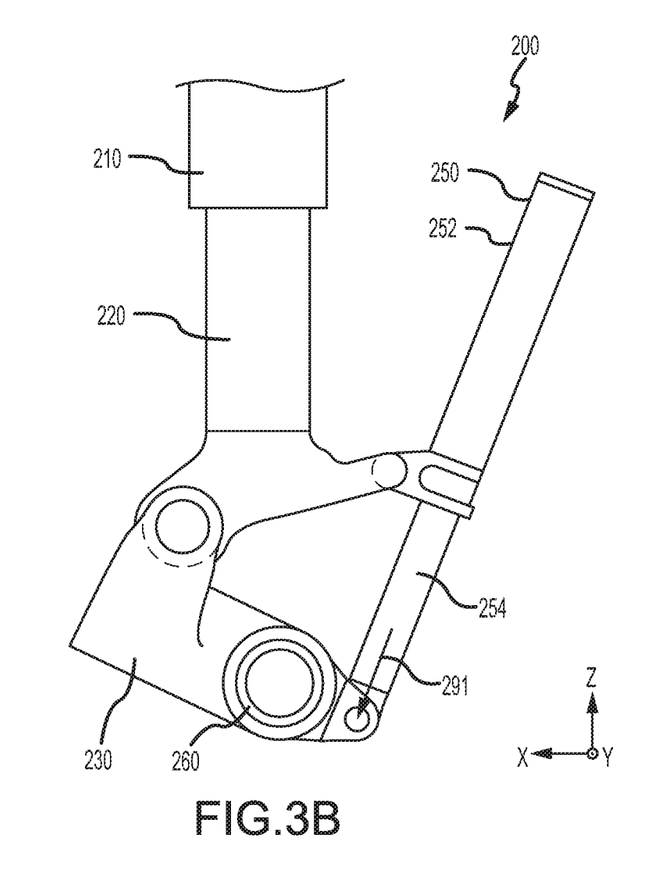
FIG. 3B illustrates a schematic view of a landing gear arrangement in a take-off position, in accordance with various embodiments.

With combined reference to FIG. 2, FIG. 3A, and FIG. 3B, load damper 250 may comprise a damper cylinder 252 and a damper piston 254. Damper piston 254 may be operatively coupled to damper cylinder 252. Damper cylinder 252 may be configured to receive damper piston 254 in a manner that allows the two components to telescope together and absorb and dampen forces transmitted thereto. In various embodiments, a liquid, such as an oil for example, may be located within damper cylinder 252. Further, a gas, such as nitrogen or air, may be located within damper cylinder 252. Damper cylinder 252 and damper piston 254 may, for example, be configured to seal such that fluid contained within damper cylinder 252 is prevented from leaking as damper piston 254 translates relative to damper cylinder 252. Load damper 250 may comprise a passive system, as described herein. In various embodiments, load damper 250 and/or lever 230 may be made from a metal material, such as stainless steel for example.

Figure 5A:
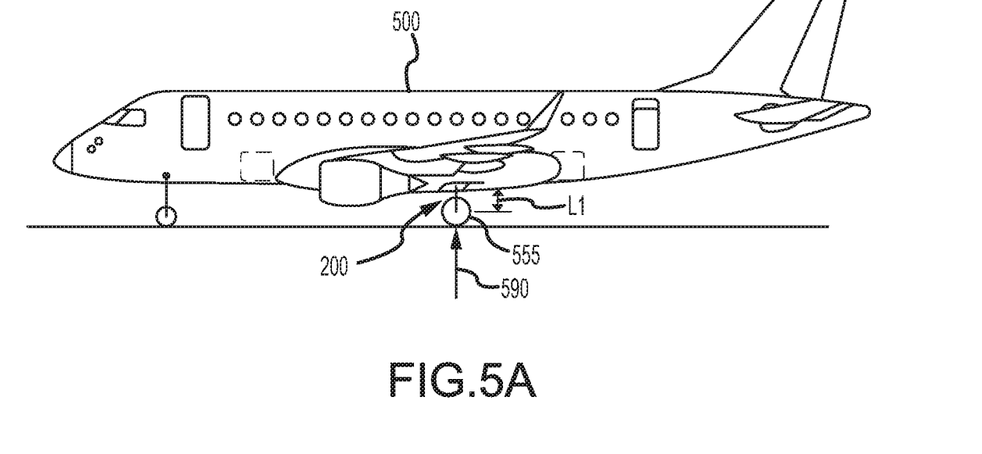
FIG. 5A illustrates a schematic view of an aircraft having a landing gear arrangement in a static position, in accordance with various embodiments.

FIG. 3A depicts landing gear arrangement 200 in a static position, such as when an aircraft is on the ground, for example. FIG. 5A depicts an aircraft 500 in a static position, not moving relative to the ground. With combined reference to FIG. 3A and FIG. 5A, shock strut 201 may be in a compressed position when aircraft 500 is in the static position. An axle 260 may be mounted to lever 230. One or more tires 555 may be mounted to axle 260. In the static position, a ground force 590 may be transmitted from the ground, through tire 555, through axle 260, into lever 230 and into both shock strut 201 and load damper 250. Stated differently, ground force 590 may be reacted through landing gear arrangement 200. Load damper 250 may transmit a force (also referred to herein as an extension force) 290 to lever 230. In various embodiments, the extension force 290 may be a product of a pressure of a fluid within load damper 250 and a surface area acted upon by said pressurized fluid of damper piston 254. In the static position, ground force 590 may be greater than extension force 290, causing load damper 250 to compress. In the static position, lever 230 may be rotated against strut piston 220. Stated differently, lever 230 may engage strut piston 220 at contact surface 232. The length L1 of landing gear arrangement 200 may decrease in response to lever 230 rotating against strut piston 220.

Figure 5B:
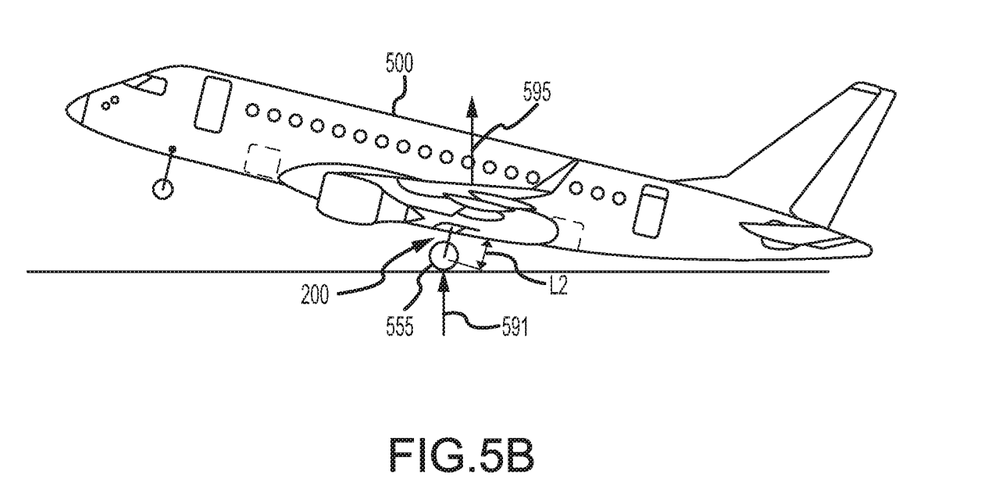
FIG. 5B illustrates a schematic view of an aircraft having a landing gear arrangement in a take-off position, in accordance with various embodiments.

FIG. 3B depicts landing gear arrangement 200 in a take-off position, such as when an aircraft takes off for flight, for example. FIG. 5B depicts an aircraft 500 in a take-off position, rotated relative to the ground. With combined reference to FIG. 3B and FIG. 5B, shock strut 201 may be in an extended position when aircraft 500 is in the take-off position. In the take-off position, ground force 591 may be transmitted from the ground, through tire 555, through axle 260, into lever 230 and into both shock strut 201 and load damper 250. Stated differently, ground force 591 may be reacted through landing gear arrangement 200. Load damper 250 may transmit a force (also referred to herein as an extension force) 291 to lever 230. In the take-off position, aircraft 500 may generate a lift force 595. Therefore, ground force 591 may decrease and ground force 591 may be less than extension force 291, allowing load damper 250 to extend. In the take-off position, lever 230 may be rotated away from strut piston 220. The length L2 of landing gear arrangement 200 may increase in response to lever 230 rotating away from strut piston 220. Stated differently, length L2 may be greater than length L1. Axle 260 may move away from shock strut 201 in response to lever 230 rotating away from strut piston 220.

Figure 4A:
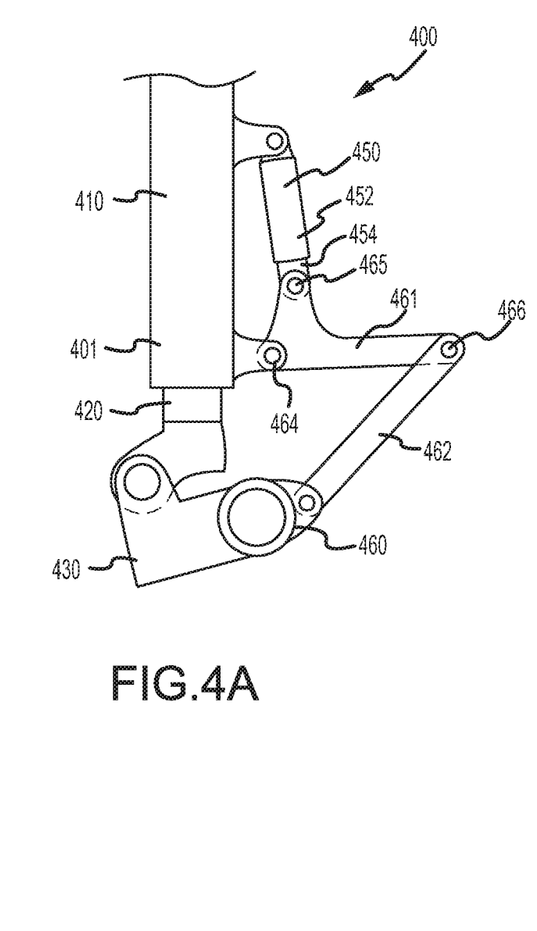
FIG. 4A illustrates a schematic view of a landing gear arrangement having a linkage in a static position, in accordance with various embodiments.
Figure 4B:
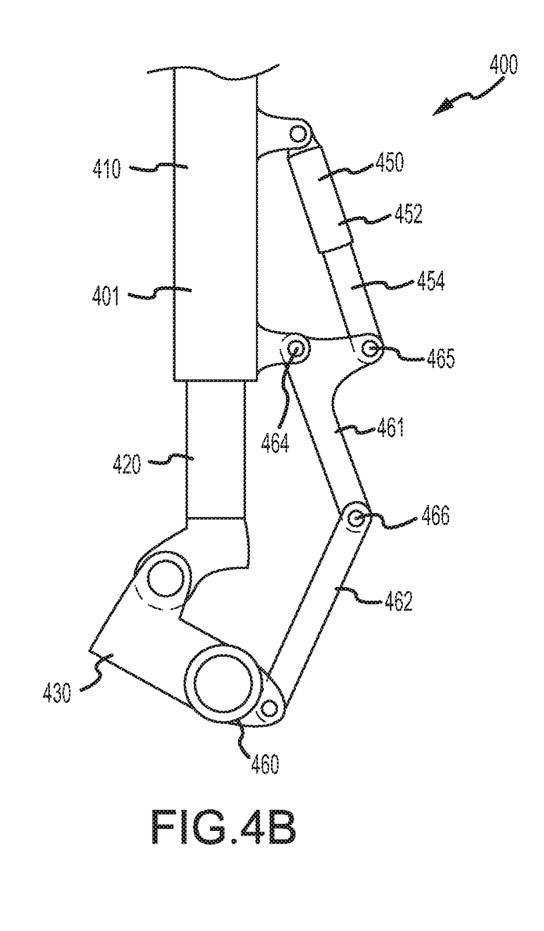
FIG. 4B illustrates a schematic view of a landing gear arrangement having a linkage in a take-off position, in accordance with various embodiments.

With reference to FIG. 4A and FIG. 4B, a landing gear arrangement 400 is illustrated, in accordance with various embodiments. Landing gear arrangement 400 may be similar to landing gear arrangement 200, with momentary reference to FIG. 3A and FIG. 3B, except that landing gear arrangement 400 further includes a linkage between load damper 450 and lever 430. By moving load damper 450 away from axle 460 and coupling load damper 450 to lever 430 via a linkage, the linkage may be capable of fitting between wheel assemblies located on either side of axle 460. In this regard, landing gear arrangement 400 may include shock strut 401, lever 430, external articulating load damper (load damper) 450, first link 461, and second link 462. First link 461 may comprise a first attachment point 464 whereby first link 461 is rotatably coupled to strut cylinder 410. First link 461 may comprise a second attachment point 465 whereby first link 461 is rotatably coupled to load damper 450. First link 461 may comprise a third attachment point 466 whereby first link 461 is rotatably coupled to second link 462. Second link 462 may be rotatably coupled to lever 430. In this regard, load damper may transmit an extension force into first link 461 which may cause first link 461 to rotate about first attachment point 464 with respect to strut cylinder 410, causing lever 430 to rotate away from strut piston 420.

Figure 6:
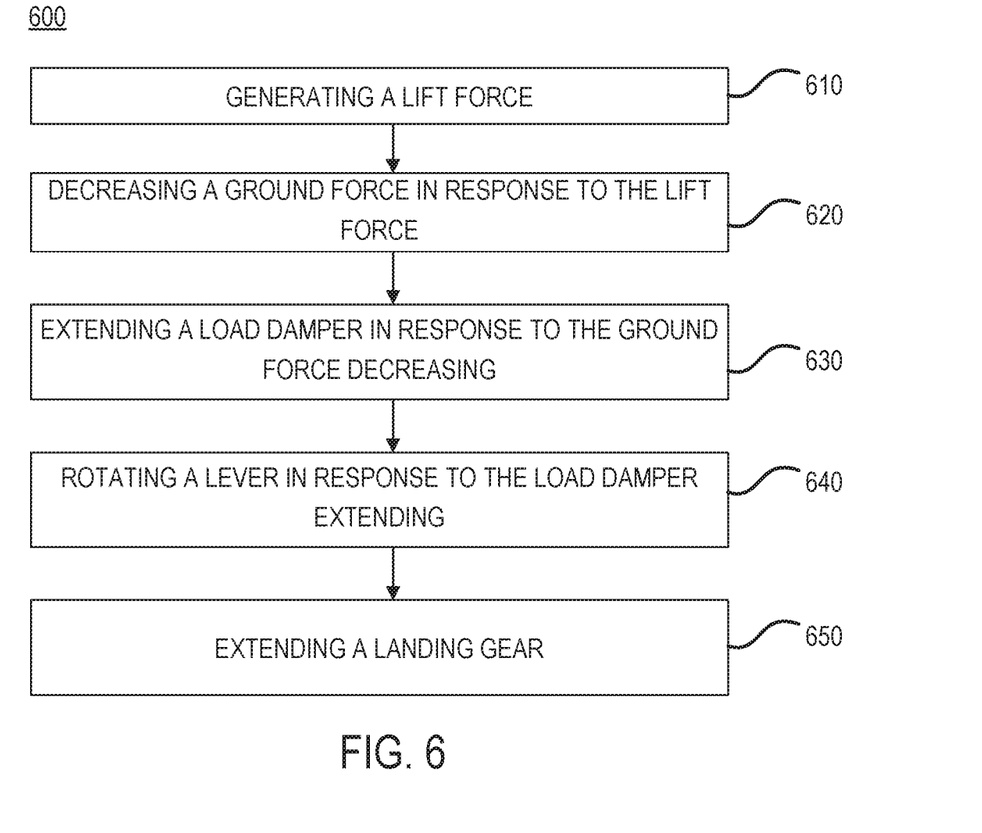
FIG. 6 illustrates a method for method for extending a landing gear, in accordance with various embodiments.

With reference to FIG. 6, a method 600 for extending a landing gear is provided, in accordance with various embodiments. Method 600 include generating a lift force (step 610). Method 600 includes decreasing a ground force in response to the lift force (step 620). Method 600 include extending a load damper in response to the ground force decreasing (step 630). Method 600 includes rotating a lever in response to the load damper extending (step 640). Method 600 includes extending a landing gear (step 650).

With combined reference to FIG. 2, FIG. 5A, FIG. 5B, and FIG. 6, step 610 may include generating a lift force 595. The lift force 595 may be generated by aircraft 500, such as via aerodynamic forces onto a wing of aircraft 500 for example. Step 620 may include decreasing ground force 590, such as decreasing from ground force 590 to ground force 591 for example, in response to lift force 595. Step 630 may include extending load damper 250 in response to ground force 591 being decreased. Step 640 may include rotating lever 230 in response to load damper 250 extending. Step 650 may include extending landing gear arrangement 200 (e.g., from length L1 to length L2) in response to the extension of load damper 250. Step 650 may include extending landing gear arrangement 200 (e.g., from length L1 to length L2) in response to the lever 230 rotating.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A landing gear arrangement, comprising:
   a lever configured to be coupled between an axle and a strut piston of a shock strut;
   a load damper configured to be externally coupled between the shock strut and the lever;
   a first link configured to be coupled to the load damper;
   a second link configured to be coupled to the lever;
   wherein the first link is configured to be rotatably coupled to the second link, and
   the load damper is configured to increase a length of the landing gear arrangement in response to an extension force of the load damper increasing above a ground force reacted through the landing gear arrangement.

2. The landing gear arrangement of claim 1, wherein the lever is configured to rotate with respect to the strut piston.

3. The landing gear arrangement of claim 1, wherein the first link comprises:
   a first attachment point whereby the first link is configured to be rotatably coupled to a strut cylinder of the shock strut;
   a second attachment point whereby the first link is configured to be rotatably coupled to the load damper; and
   a third attachment point whereby the first link is configured to be rotatably coupled to the second link.

4. The landing gear arrangement of claim 1, wherein the load damper comprises:
   a load damper cylinder; and
   a load damper piston operatively coupled to the load damper cylinder.

5. The landing gear arrangement of claim 1, wherein the load damper passively transmits the extension force to the lever.

6. A landing gear arrangement for an airplane, comprising:
   a shock strut comprising a strut cylinder and a strut piston, wherein the strut piston has a first end disposed within the strut cylinder and a second end extending from the strut cylinder;
   a lever coupled to the second end of the strut piston; and
   a load damper coupled between the shock strut and the lever, wherein the load damper is located externally from the strut piston;
   a first link coupled to the load damper; and
   a second link coupled to the lever and rotatably coupled to the first link, and
   the load damper is configured to increase a length of the landing gear arrangement in response to an extension force of the load damper increasing above a ground force reacted through the landing gear arrangement.

7. The landing gear arrangement of claim 6, wherein the lever rotates with respect to the strut piston.

8. The landing gear arrangement of claim 6, wherein the load damper comprises:
   a load damper cylinder; and
   a load damper piston operatively coupled to the load damper cylinder.

9. The landing gear arrangement of claim 6, wherein the load damper passively transmits the extension force to the lever.

10. The landing gear arrangement of claim 6, wherein the load damper is mechanically coupled to the strut piston.

11. The landing gear arrangement of claim 6, wherein the load damper is mechanically coupled to the strut cylinder.

12. The landing gear arrangement of claim 11, wherein the first link comprises:
    a first attachment point whereby the first link is rotatably coupled to the strut cylinder;
    a second attachment point whereby the first link is rotatably coupled to the load damper; and
    a third attachment point whereby the first link is rotatably coupled to the second link.

13. The landing gear arrangement of claim 6, further comprising an axle mounted to the lever.

14. The landing gear arrangement of claim 7, wherein the lever rotates away from the second end in response to the load damper extending.

15. The landing gear arrangement of claim 7, wherein the lever engages the second end in response to the load damper compressing.

16. A method for extending a landing gear for an airplane, comprising:
    generating a lift force;
    decreasing a ground force in response to the lift force;
    extending a load damper in response to the ground force being decreased;
    rotating a lever in response to the load damper being extended, wherein the lever is coupled to the load damper via a first link and a second link, the first link is coupled to the load damper, the second link is coupled to the lever, and the second link is rotatably coupled to the first link; and
    extending the landing gear in response to the load damper being extended,
    wherein the load damper is located externally from the landing gear.

17. The method of claim 16, wherein the load damper extends in response to the ground force decreasing below an extension force of the load damper.

* * * * *